US008239324B2

(12) United States Patent
Asai et al.

(10) Patent No.: US 8,239,324 B2
(45) Date of Patent: Aug. 7, 2012

(54) MOBILE TERMINAL

(75) Inventors: Mao Asai, Kawasaki (JP); Shingo Sugimoto, Nagoya (JP); Naoki Naruse, Yokohama (JP); Hisashi Yoshinaga, Yokohama (JP); Kumiko Yamaguchi, Yokosuka (JP)

(73) Assignee: NTT DoCoMo. Inc., Tokyo (JP)

( * ) Notice: Subject to any disclaimer, the term of this patent is extended or adjusted under 35 U.S.C. 154(b) by 117 days.

(21) Appl. No.: 12/043,677

(22) Filed: Mar. 6, 2008

(65) Prior Publication Data

US 2008/0222036 A1 Sep. 11, 2008

(30) Foreign Application Priority Data

Mar. 7, 2007 (JP) ................ P2007-057618

(51) Int. Cl.
*G06Q 40/00* (2012.01)
(52) U.S. Cl. .......................................... 705/41; 705/35
(58) Field of Classification Search ............... 705/39, 705/41, 35
See application file for complete search history.

(56) References Cited

U.S. PATENT DOCUMENTS

| | | | |
|---|---|---|---|
| 4,736,094 A | 4/1988 | Yoshida | |
| 5,884,271 A | 3/1999 | Pitroda | |
| 6,868,391 B1 * | 3/2005 | Hultgren | 705/26 |
| 7,010,695 B1 * | 3/2006 | Mizuguchi | 713/185 |
| 7,357,309 B2 * | 4/2008 | Ghosh et al. | 235/380 |
| 7,363,252 B2 * | 4/2008 | Fujimoto | 705/26.8 |
| 7,400,906 B2 * | 7/2008 | Katayanagi | 455/558 |
| 7,573,991 B2 * | 8/2009 | Kunugi et al. | 379/114.17 |
| 7,720,717 B2 * | 5/2010 | Fujita et al. | 705/26.35 |
| 7,752,098 B2 * | 7/2010 | Matsutani | 705/35 |
| 8,006,901 B2 * | 8/2011 | Sato et al. | 235/383 |
| 2001/0016835 A1 * | 8/2001 | Hansmann et al. | 705/40 |
| 2002/0107799 A1 * | 8/2002 | Hoshino et al. | 705/41 |
| 2003/0004876 A1 * | 1/2003 | Jacobson | 705/41 |
| 2005/0165497 A1 | 7/2005 | Tanabe | |

(Continued)

FOREIGN PATENT DOCUMENTS

EP 1 450 322 A1 8/2004

(Continued)

OTHER PUBLICATIONS

Office Action issued on Oct. 7, 2011 in the corresponding European Application No. 08 004 277.3.

(Continued)

*Primary Examiner* — Thomas Dixon
*Assistant Examiner* — Benjamin S Fields
(74) *Attorney, Agent, or Firm* — Oblon, Spivak, McClelland, Maier & Neustadt, L.L.P.

(57) ABSTRACT

A mobile terminal capable of causing the user side to grasp whether or not a credit settlement service stops with a simple operation is provided. In the mobile terminal 10, validation and invalidation of a storage area within an IC chip assigned to an issuer application corresponding to one issuer are switched based on switching instruction information received from an issuer terminal 20 managed by one issuer. Then, when the issuer application starts, there is displayed in a lump whether or not the respective issuer applications are available on a display part 16, based on state information indicating whether or not the respective storage areas are validated. Therefore, in the mobile terminal 10, even if plural issuer applications are stored, it is possible to cause the user side to grasp which kind of the credit settlement service stops, with a simple operation of only starting a management application.

2 Claims, 9 Drawing Sheets

U.S. PATENT DOCUMENTS

| | | | |
|---|---|---|---|
| 2007/0116292 A1* | 5/2007 | Kurita et al. | 380/270 |
| 2008/0270301 A1* | 10/2008 | Jones et al. | 705/41 |
| 2009/0298543 A1* | 12/2009 | Willemin | 455/558 |
| 2010/0115164 A1* | 5/2010 | Huang et al. | 710/100 |

FOREIGN PATENT DOCUMENTS

| | | |
|---|---|---|
| JP | 2000-112719 | 4/2000 |
| JP | 2002-279320 | 9/2002 |
| JP | 2004-30150 | 1/2004 |
| JP | 2004-310511 | 11/2004 |
| JP | 2004-320438 | 11/2004 |
| JP | 2005-301489 | 10/2005 |
| KR | 10-0470284 | 2/2002 |
| WO | WO 2004/070598 A1 | 8/2004 |
| WO | WO 2005/089132 A2 | 9/2005 |

OTHER PUBLICATIONS

Hajime Yoshida, "Current State and Problems of IC Card Technology, Information Processing", Information Processing Society of Japan, vol. 43, No. 8, Mar. 15, 2002, 3 cover pages and pp. 296-303 (with English translation).

Ryutaro Taji, "Newest IC Card Technology and Trends in Use of the Same, Part 5 of "Business Communication"", Business Communication, vol. 38, No. 8, Aug. 1, 2001, 3 cover pages and pp. 84-89 (with English translation).

* cited by examiner

| MANAGEMENT APPLICATION IDENTIFIER | ISSUER APPLICATION IDENTIFIER | ISSUER CODE | PROCESSING CONTENT |
|---|---|---|---|
| 00000000 | 00000001 | a | INVALIDATED |
| ... | ... | ... | ... |

| STORAGE AREA | ISSUER APPLICATION IDENTIFIER | CURRENT STATE INFORMATION |
|---|---|---|
| X1 | 00000001 | VALIDATED |
| X2 | 00000002 | VALIDATED |
| X3 | 00000003 | VALIDATED |

| STORAGE AREA | ISSUER APPLICATION IDENTIFIER | CURRENT STATE INFORMATION |
|---|---|---|
| X1 | 00000001 | INVALIDATED |
| X2 | 00000002 | VALIDATED |
| X3 | 00000003 | VALIDATED |

*Fig.6*

| STORAGE AREA | ISSUER APPLICATION IDENTIFIER | STATE INFORMATION |
|---|---|---|
| X1 | 00000001 | INVALIDATED |
| X2 | 00000002 | VALIDATED |
| X3 | 00000003 | VALIDATED |

MOBILE TERMINAL

BACKGROUND OF THE INVENTION

1. Field of the Invention

The present invention relates to a mobile terminal capable of utilizing plural kinds of credit settlement services.

2. Related Background of the Invention

Recently, there progresses development of a technology in which one mobile terminal enables anyone to utilize plural kinds of credit settlement services. As such a technology, for instance, the patent document 1 (Japanese Laid-Open Patent Publication No. 2004-310511) discloses the management system for multifunction IC card. This conventional management system is a system to realize batch stopping of the card function when the multifunction IC card is lost. In this management system, when information to require stopping of the card function is transmitted to the mobile terminal of the user side from the management server, an issuer of the card utilized on the aforementioned mobile terminal is automatically retrieved. Then, the information to instruct stopping of the card function is transmitted in a lump to the terminal of the issuer retrieved.

SUMMARY OF THE INVENTION

Meanwhile, when plural kinds of credit settlement services described above are installed in the mobile terminal, it is preferable for the user side to be capable of grasping which kind of credit settlement service is invalid. In addition, a required operation to grasp whether or not the credit settlement service is invalid is preferably as easy as possible.

The present invention has been achieved for resolving the above described problem, and an object is to provide a mobile terminal capable of causing the user side to grasp whether or not the credit settlement service stops with simple operation.

In order to resolve the above described problem, a mobile terminal according to the present invention includes: an issuer application storage means storing an issuer application to manage settlement information of an issuer providing a credit settlement service; an IC chip storage means storing an IC chip having at least one or more storage area which is assigned to each of the issuer application and stores the settlement information managed by the issuer application; a switching instruction information reception means receiving switching instruction information to instruct switching of validation and invalidation of the storage area assigned to one issuer application from an issuer terminal managed by one issuer; a storage area control means individually switching validation and invalidation of the storage area based on the switching instruction information received by the switching instruction information reception means; and a management application storage means storing a management application to cause a display means to display in a lump whether or not the issuer application is available based on state information indicating whether or not the storage area is validated when the issuer application is started.

In the mobile terminal, there is performed switching of validation and invalidation of the storage area within the IC chip assigned to the issuer application corresponding to one issuer, based on the switching instruction information received from the issuer terminal. Then, when the issuer application is started, there is displayed in a lump whether or not the respective issuer applications are available on the display means, based on the state information indicating whether or not the respective storage areas are validated. Therefore, in this mobile terminal, even if plural issuer applications are stored, it is possible to cause the user side to grasp which kind of credit settlement service stops, with a simple operation of only starting the management application.

In addition, there are preferably further provided a reference table storage means storing a reference table including the state information after the storage area control means has switched validation and invalidation of the storage area; a current state information reception means receiving from the IC chip current state information indicating whether or not the storage area is actually validated when the issuer application is started; and a reference table update means updating the state information included in the reference table based on the current state information, if the current state information does not coincide with the state information when collating the current state information received by the current state information reception means and the state information within the reference table. In this case, it is possible to suppress occurrence of discrepancy between the current state of the storage area of the IC chip and the state information included in the reference table. In addition, it is possible to prevent the settlement information stored in the storage area from needlessly flowing out toward the management application side in such a way that the management application does not directly access the storage area of the IC chip.

According to the mobile terminal related to the present invention, it becomes possible to cause the user side to grasp whether or not the credit settlement service stops with a simple operation.

DESCRIPTION OF THE PREFERRED EMBODIMENTS

There will be described in detail a preferred embodiment of a mobile terminal according to the present invention while referring to the drawings below.

Figure 1:
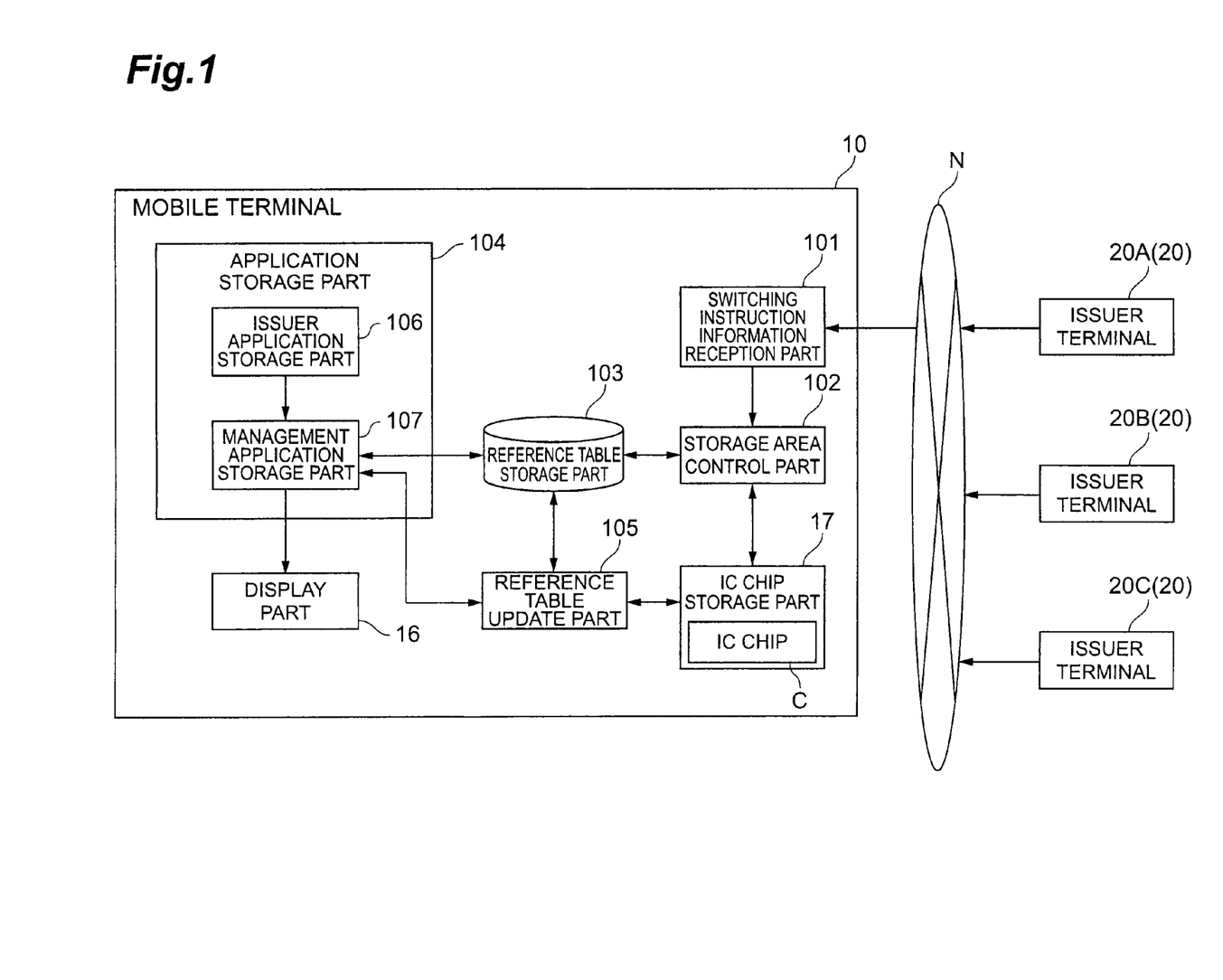
FIG. 1 is a diagram showing a mobile terminal according to one embodiment of the present invention.

FIG. 1 is a diagram showing the mobile terminal according to one embodiment of the present invention. A mobile terminal 10 shown in the same drawing is constituted such that plural kinds of credit settlement services can be utilized with one terminal in accordance with various kinds of use situations by the user, such as payment of the purchased articles, or payment of transportation expense of railway/bus or the like.

This mobile terminal 10 is connected to plural issuer terminals 20 (20A, 20B, 20C . . . ) managed by the issuer providing the credit settlement service in a mutually communicable manner, by using a network N including a base station and an exchange. To the mobile terminal 10, there are installed plural (three, in the present embodiment) applications (hereinafter referred to as "issuer application") provided from the issuer to enable the credit settlement service to be available, and an upper-level application (hereinafter referred to as "management application") to supervise the respective issuer applications.

The issuer terminal 20 is a terminal managed by a credit settlement service provider. The issuer terminal 20 is a computer system physically provided with a CPU, a memory, a communication interface, a storage part such as a hard disk, and a display part such as a display. The issuer terminal 20, when a user of the mobile terminal 10 joins the credit settlement service of the aforementioned service provider, transmits registration information of registering the credit settlement service of the service provider into a storage area X (described later) of an IC chip C, to the mobile terminal 10.

In addition, the issuer terminal 20 transmits switching instruction information instructing invalidation of the storage area X (refer to FIG. 4) of the IC chip C built in the mobile terminal 10, in cases where the credit settlement service to the user of the mobile terminal 10 stops, for instance, when payment stagnates for a certain period of time. The issuer terminal 20, when resuming the credit settlement service, transmits the switching instruction information instructing validation of the storage area X of the IC chip C. The storage area X of the IC chip C will be described later.

Figure 2:
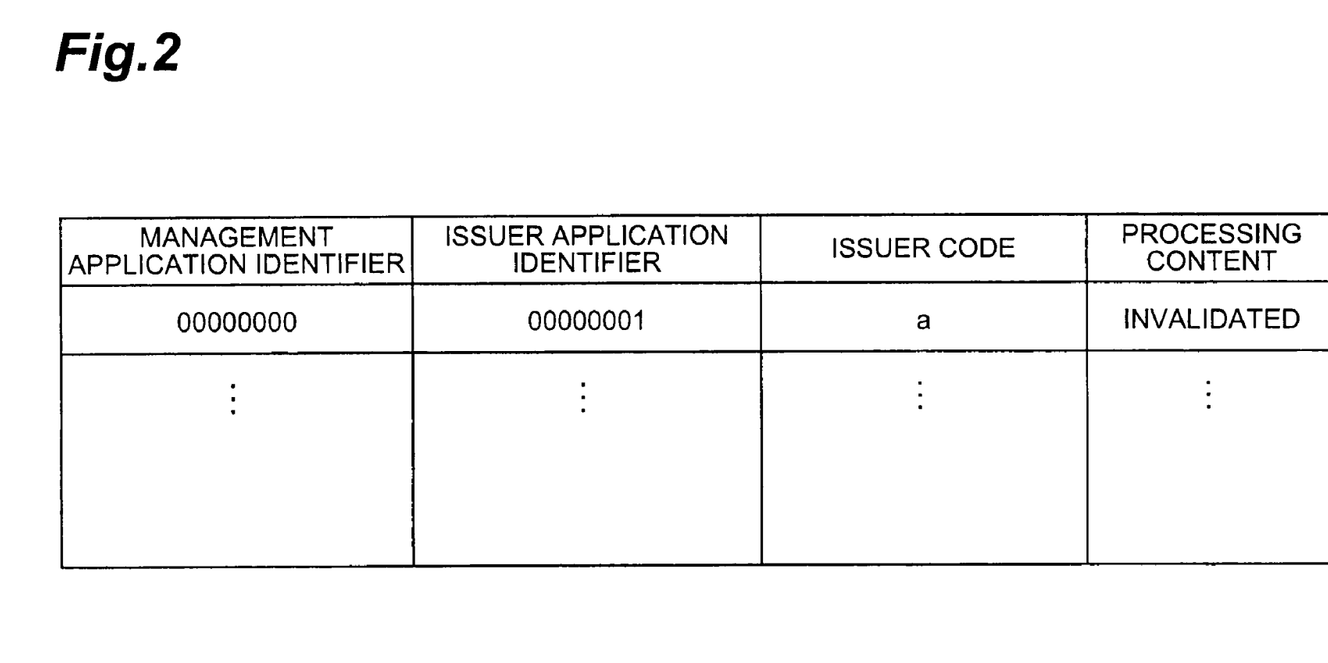
FIG. 2 is a diagram showing one example of switching instruction information.

FIG. 2 shows one example of the switching instruction information. In the example shown in FIG. 2, pieces of information such as a management application identifier "00000000", an issuer application identifier "00000001", an issuer code "a", and a processing content "invalidated" are associated with one another. The management application identifier and the issuer application identifier are the identifiers previously assigned to the mobile terminal 10 to identify the management application and the issuer application. The issuer code is an area code or a service code for identifying the issuer which has transmitted the switching instruction information.

Figure 3:
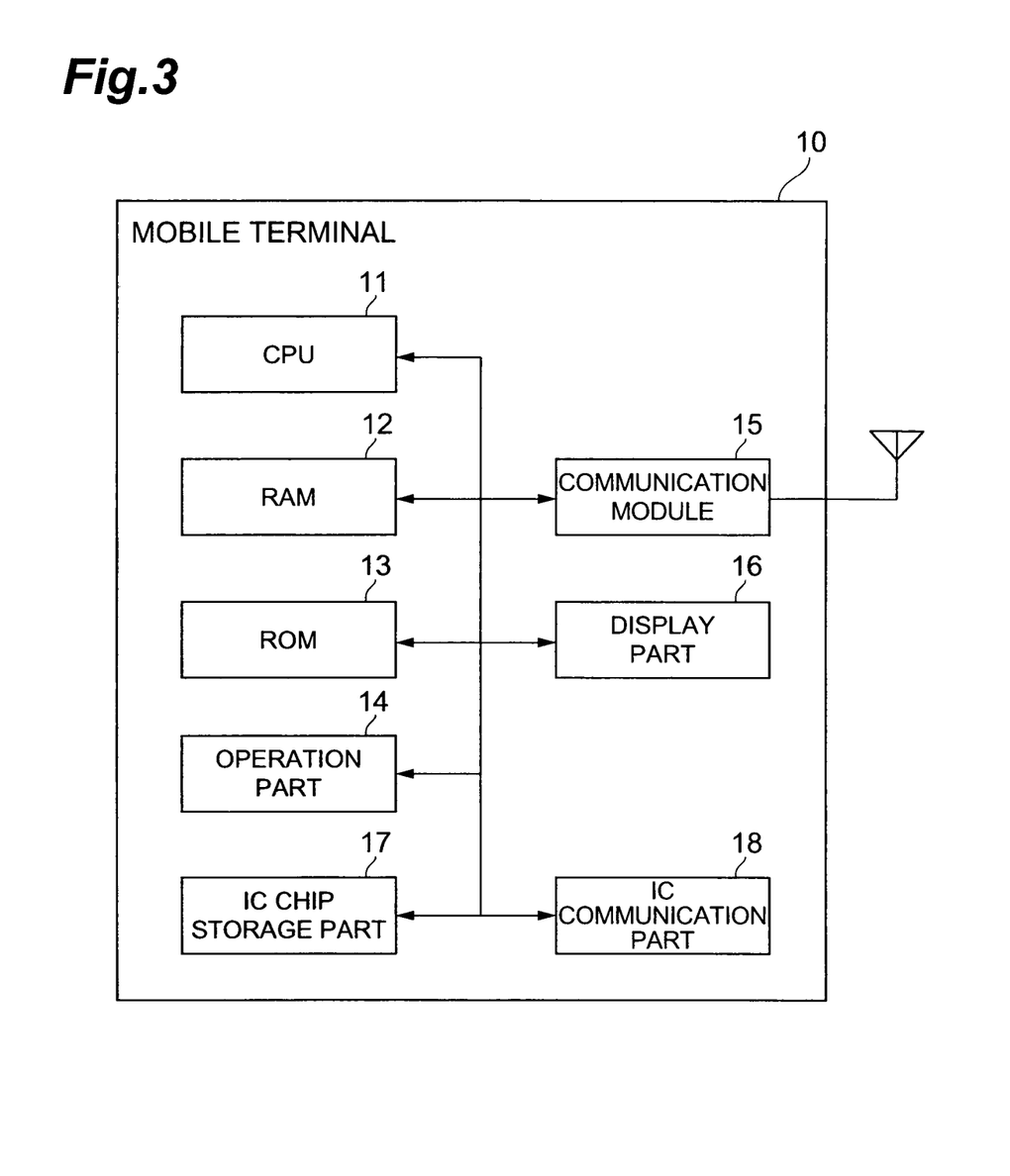
FIG. 3 is a diagram showing a hardware configuration of the mobile terminal shown in FIG. 1.

The mobile terminal 10, as shown in FIG. 3, is physically provided with storage devices such as a CPU 11, a RAM 12, and a ROM 13, an operation part 14 such as an input button, a communication module 15 such as a network card, and a display part 16 such as a liquid crystal panel display. Respective functions of the mobile terminal 10 to be described later are realized in such a way that there are performed read and write of data of the RAM 12 or the like, while operating the communication module 15, the operation part 14 and the display part 16 under the control of the CPU 11, upon causing hardware such as the CPU 11, the RAM 12 shown in the same drawing to read predetermined computer software.

Figure 4:
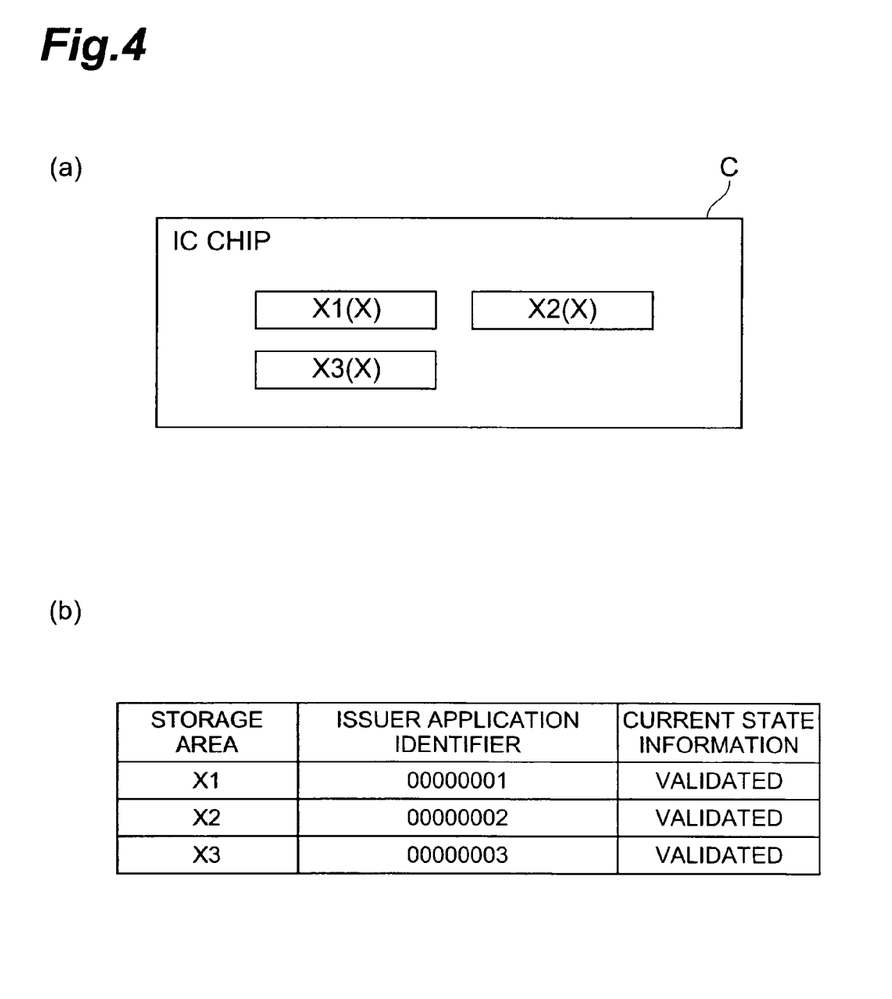
FIG. 4 is a diagram showing one example of a storage area of an IC chip and current state information.

In addition, the mobile terminal 10 is provided with an IC chip storage part (IC chip storage means) 17 for detachably storing a non-contact type IC chip C, and a non-contact type IC communication part 18 performing transmission/reception of information with the IC chip C. The IC chip C has storage areas X assigned to each issuer application. Here, FIG. 4(a) shows one example of the storage area X of the IC chip C. In the example shown in FIG. 4(a), three storage areas X (storage areas X1 to X3) are formed within the IC chip C. The respective storage areas X1 to X3 are assigned to the respective three issuer applications installed on the mobile terminal 10, in which settlement information managed by each issuer application is stored. Incidentally, in the settlement information described here, information indicating, for instance, kind of credit cards is included.

In addition, the IC chip C has current state information indicating whether or not the storage area X is validated actually. FIG. 4(b) is a diagram showing one example of the current state information. As shown in FIG. 4(b), in the current state information, the storage area, the identifier of corresponding issuer application and the current state information of the storage area are associated with one another and stored.

In the example of FIG. 4(b), with respect to the storage area "X1" corresponding to the issuer application of the application identifier "000000011", the storage area "X2" corresponding to the issuer application of the application identifier "00000002", and the storage area "X3" corresponding to the issuer application of the application identifier "00000003", the current state information is "validated".

In addition, the mobile terminal 10, as shown in FIG. 1, is provided with, as functional components, a switching instruction information reception part (switching instruction information reception means) 101, a storage area control part (storage area control means) 102, a reference table storage part (reference table storage means) 103, an application storage part 104, and a reference table update part (current state information reception means, reference table update means) 105.

The switching instruction information reception part 101 is a part which receives switching instruction information from the issuer terminal 20. The switching instruction information reception part 101 outputs the received switching instruction information to the storage area control part 102. The storage area control part 102 is a part individually switching validation and invalidation of the storage area X assigned to one issuer application while controlling the IC chip C based on the switching instruction information. The storage area control part 102, when receiving the switching instruction information shown in FIG. 3, for instance, invalidates the storage area "X1" corresponding to the issuer application identified by the issuer application identifier "00000001", as shown in FIG. 5(a).

Figure 5:
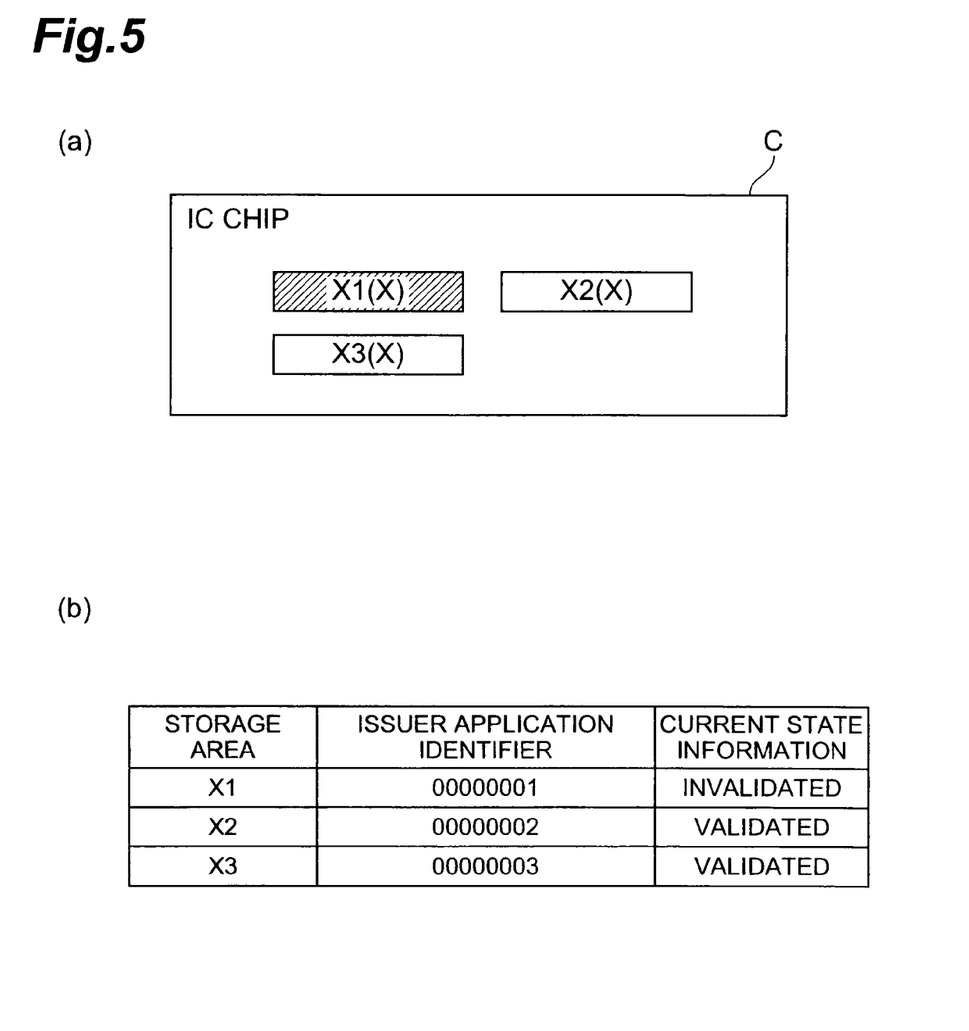
FIG. 5 is a diagram showing one example of the storage area of the IC chip and the current state information after switching of validation and invalidation of the storage area is performed.

At this time, in the IC chip C side, as shown in FIG. 5(b), the current state information is updated. That is, with respect to the storage area "X1" corresponding to the issuer application of the application identifier "00000001", the current state information becomes "invalidated". With respect to the storage area "X2" corresponding to the issuer application of the application identifier "00000002", and the storage area "X3" corresponding to the issuer application of the application identifier "00000003", continuously the current state information remains "validated".

In the issuer application corresponding to the storage area X1 in which the storage area X is invalidated, access to the settlement information stored in the storage area X1 is prohibited. In addition, in the issuer application corresponding to the storage areas X2, X3 in which the storage area X remains validated, access to the settlement information is kept possible.

Figure 6:
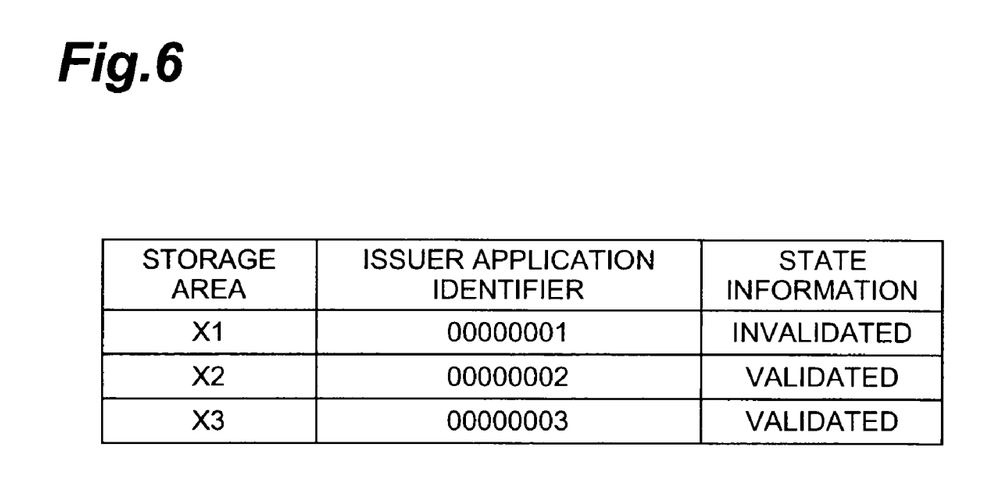
FIG. 6 is a diagram showing one example of a reference table.

The storage area control part 102 performs rewriting of the reference table stored in the reference table storage part 103, after switching validation and invalidation of the storage area X. One example of the reference table is shown in FIG. 6. In the example shown in FIG. 6, with respect to the storage area "X1" corresponding to the issuer application of the application identifier "00000001", the state information becomes "invalidated". In addition, with respect to the storage area "X2" corresponding to the issuer application of the application identifier "00000002", and the storage area "X3" corresponding to the issuer application of the application identifier "00000003", the state information becomes "validated".

The application storage part 104 is a part for storing the management application and the issuer application. The management application and the issuer application are respectively stored in the management application storage part 107 and the issuer application storage part 106, with the state of being associated with, for instance, an application identifier composed of 8-digit character string.

The management application and the issuer application start with the predetermined operation of the operation part 14 by the user. The management application starts and outputs updating instruction information of instructing updating of the reference table to the reference table update part 105.

The management application, when receiving completion information output from the reference table update part 105 in accordance with output of the updating instruction information, refers to the reference table storage part 103 to acquire the state information included in the reference table. Then, the management application causes the display part 16 to display in a lump whether or not the issuer application is available, based on the acquired state information.

Figure 7:
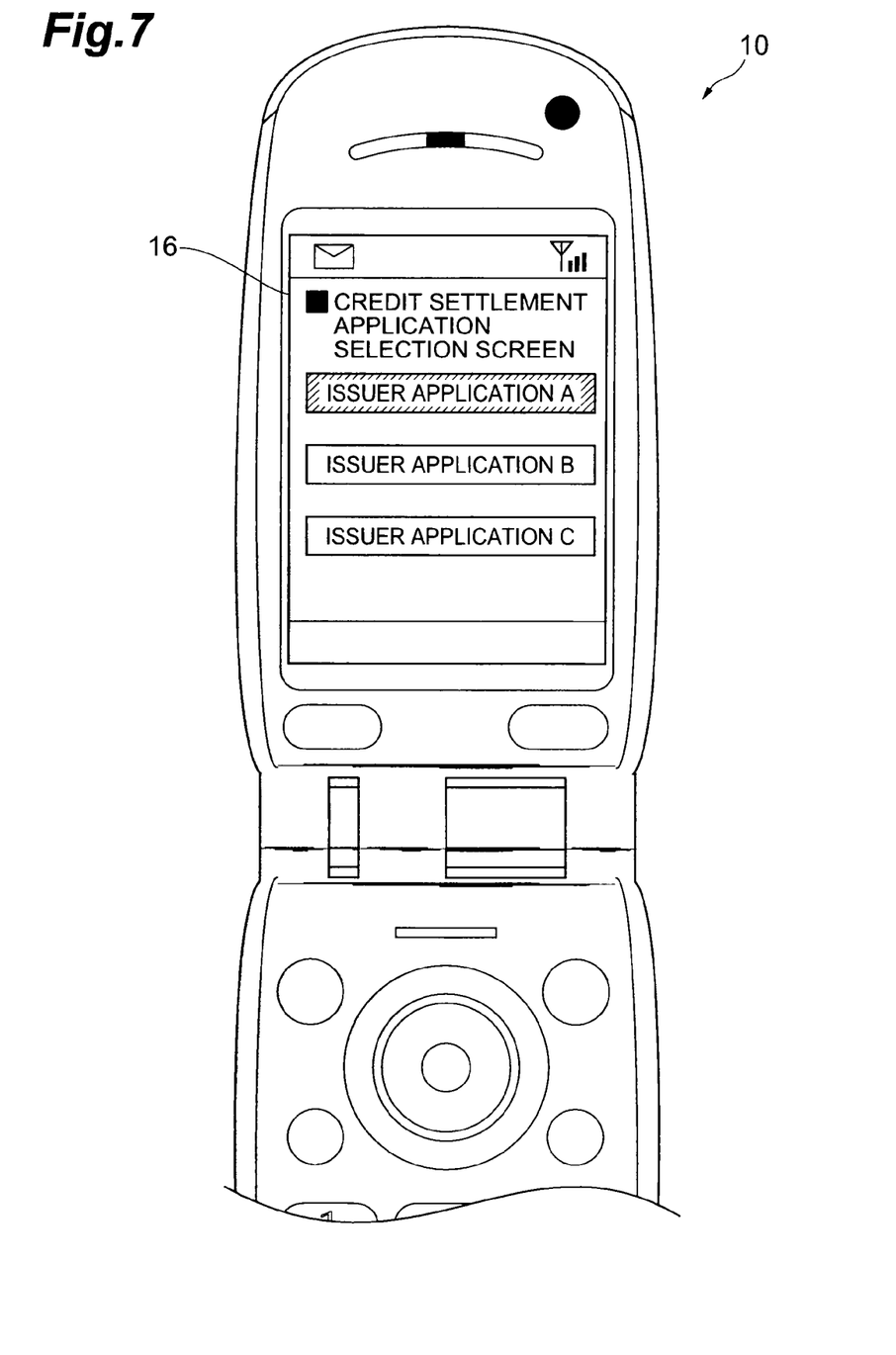
FIG. 7 is a diagram showing one example of whether or not respective issuer applications are available, being displayed in a lump on a display part.

FIG. 7 shows one example of whether or not the issuer application is available, being displayed in a lump on the display part. In the example shown in FIG. 7, a credit settlement application selection screen is displayed on the display part 16. Then, in the credit settlement application selection screen, an icon for selecting the issuer application (issuer application A) corresponding to the storage area X1 in which the state information is "invalidated" is displayed with dark color such as for instance, gray. In addition, icons for selecting the issuer applications (issuer applications B, C) corresponding to the storage areas X2, X3 in which the state information is "validated", are displayed with light color such as for instance, white.

The reference table update part 105 is a part for performing updating of the reference table. The reference table update part 105, when receiving the updating instruction information from the management application, firstly, transmits request information for requesting transmission of the current state information to the IC chip C. The reference table update part 105 receives the current state information transmitted from the IC chip C in accordance with transmission of the request information.

When receiving the current state information, the reference table update part 105, next, refers to the reference table storage part 103 to judge whether or not the current state information received from the IC chip C coincides with the state information stored within the reference table. The reference table update part 105, in cases where the current state information coincides with the state information, outputs the completion information to the management application without updating the reference table.

On the other hand, when instruction information that full format of the IC chip C is performed is transmitted to the mobile terminal 10 from a terminal (not shown) of the service provider who provides a communication service of the mobile terminal 10, for instance, there may occur a case where the current state information does not coincide with the state information. When the current state information does not coincide with the state information like this, the reference table update part 105 updates the state information included in the reference table so as to coincide with the current state information. Then, the reference table update part 105 outputs the completion information that updating of the reference table is completed to the management application.

Figure 8:
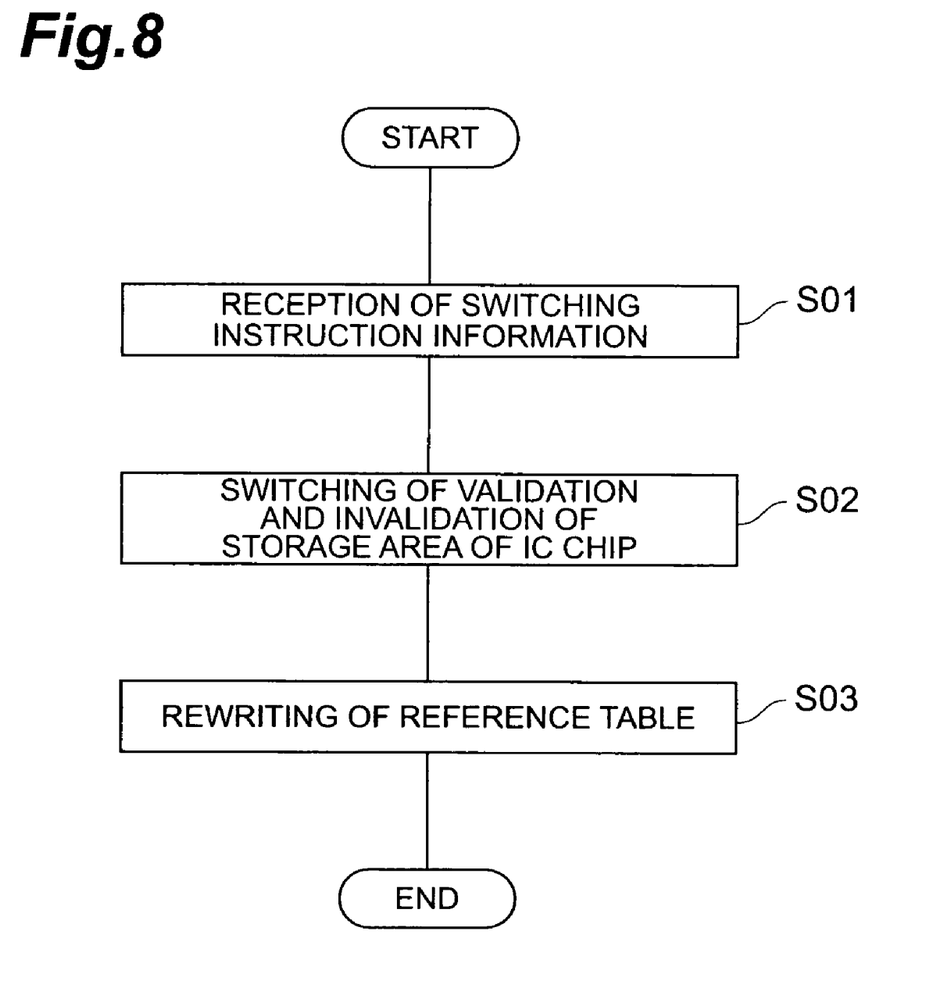
FIG. 8 is a flowchart showing an operation when switching instruction information is received in the mobile terminal shown in FIG. 1.
Figure 9:
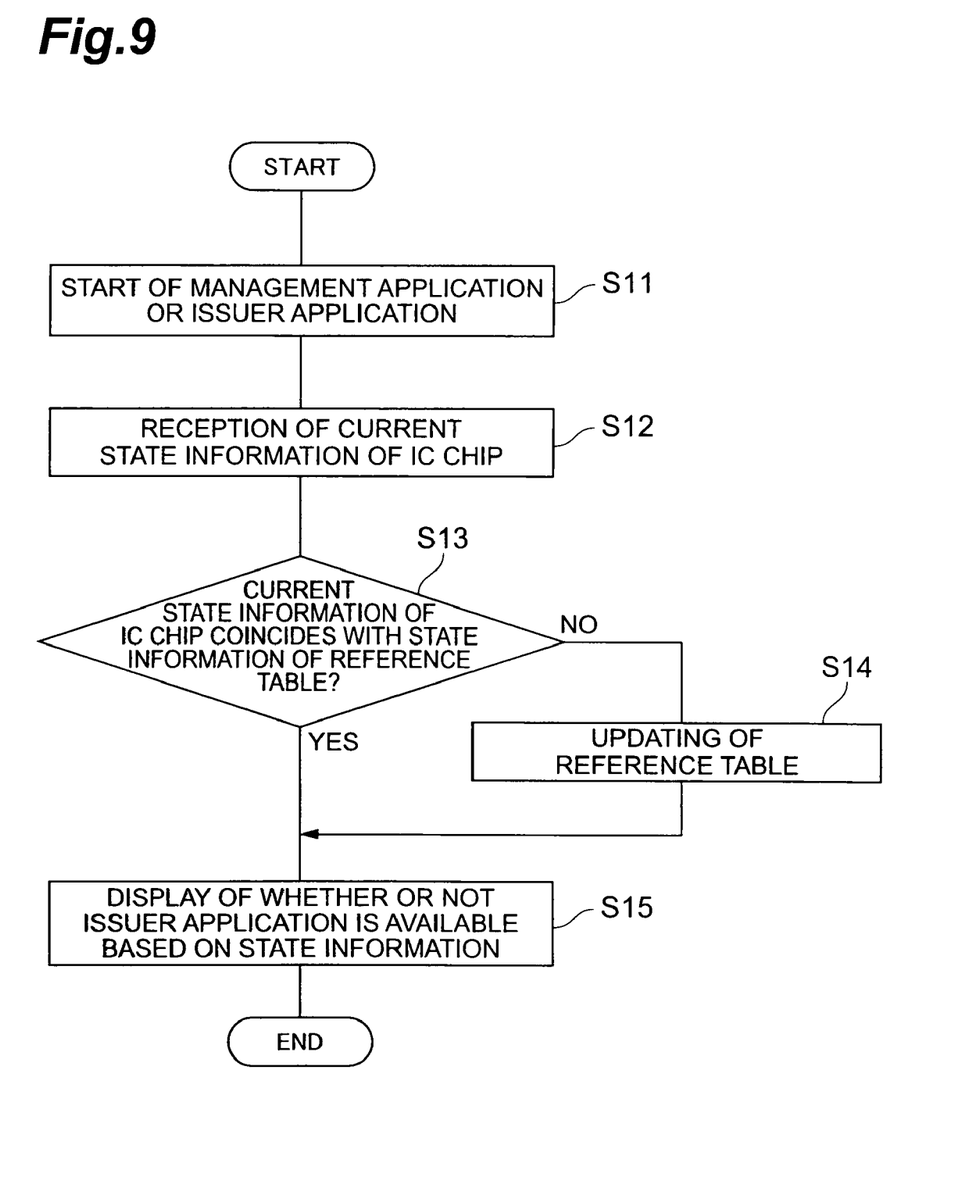
FIG. 9 is a flowchart showing an operation when a user utilizes a credit settlement service in the mobile terminal shown in FIG. 1.

Continuously, there will be described operation of the above described mobile terminal 10 while referring to the flowchart shown in FIGS. 8 and 9.

First, there will be described operation when the mobile terminal 10 receives the switching instruction information. As shown in FIG. 8, in the mobile terminal 10, when the switching instruction information is received from the issuer terminal 20 (step S01), there is performed switching of validation and invalidation of the storage area X assigned to the issuer application identified by the switching instruction information (step S02).

When the storage area X is invalidated, in the issuer application corresponding to this storage area X, access to the settlement information stored in the storage area X is prohibited. When the switching of validation and invalidation of the storage area X is completed, rewriting of the state information of the storage area X included in the reference table is performed (step S03).

Next, there will be described operation when the user utilizes the credit settlement service. As shown in FIG. 9, when the user performs the predetermined operation of the operation part 14, the management application or the issuer application starts (step S11). When the management application or the issuer application starts, the mobile terminal 10 receives the current state information from the IC chip C (step S12).

Next, the mobile terminal 10 refers to the reference table based on the current state information received from the IC chip C, and judges whether or not the current state information of the IC chip C coincides with the state information included in the reference table (step S13). In cases where it is judged that the current state information of the IC chip C does not coincide with the state information included in the reference table, the state information included in the reference table is updated so as to coincide with the current state information (step S14).

On the other hand, in the step S13, in cases where it is judged that the current state information of the IC chip C coincides with the state information included in the reference table, or in cases where, in step S14, updating of the state information of the reference table is completed, it is displayed in a lump whether or not the issuer application is available based on the state information (step S15). That is, on the credit settlement service selection screen, an icon for selecting the issuer application corresponding to the storage area X in which the state information is "invalidated", is displayed with dark color. In addition, an icon for selecting the issuer application corresponding to the storage area X in which the state information is "validated", is displayed with light color.

As described above, in the mobile terminal 10, based on the switching instruction information received from the issuer terminal 20 managed by one issuer, there is performed the switching of validation and invalidation of the storage area X within the IC chip C assigned to the issuer application corresponding to the one issuer. Then, when the issuer application starts, there is displayed in a lump whether or not the respective issuer applications are available on the display part 16 based on the state information indicating whether or not the respective storage areas X are validated. Therefore, in the mobile terminal 10, even if plural issuer applications are stored, it is possible to cause the user side to grasp which kind of the credit settlement service is stopped with the simple operation of only starting the management application.

In addition, when the instruction information that full format of the IC chip C is performed is transmitted to the mobile terminal 10 from the terminal of the service provider who provides the communication service of the mobile terminal 10, for instance, there may occur the case where the current state information does not coincide with the state information. To cope with this, the mobile terminal 10, when displaying in a lump whether or not the respective issuer applications are available, on the display part 16, receives from the IC chip C the current state information indicating whether or not the storage area X is actually validated. Then, the received current state information is collated with the state information within the reference table, and when the current state information does not coincide with the state information, the state information included in the reference table is updated based on the current state information. By this operation, in the mobile terminal 10, it is possible to suppress occurrence of discrepancy between the current state of the storage area X of the IC chip C and the state information included in the reference table. In addition, it is possible to prevent the settlement information stored in the storage area X from needlessly flowing out toward the management application side in such a way that the management application does not access directly the storage area X of the IC chip C.

The present invention is not limited to the above described embodiment. For instance, in the embodiment described above, there is provided the reference table storage part 103 for storing the reference table within the mobile terminal 10, and there is displayed in a lump whether or not the respective issuer applications are available on the display part 16 based on the state information within the reference table. However, there may be displayed in a lump whether or not the respective issuer applications are available on the display part 16 based on the current state information within the IC chip C without providing the reference table storage part 103. Meanwhile, there may be displayed in a lump whether or not the respective issuer applications are available on the display part 16 depending on the respective issuer applications while outputting the state information within the reference table to the issuer application side.

In addition, in the above described step S11, when the management application and the issuer application start, there are judged whether or not the application identifier of the management application is stored in the management application storage part 107 and whether or not the application identifier of the issuer application is stored in the issuer application storage part 106, and when the application identifier is not stored, subsequent processing may forcibly be finished. By this operation, it is possible to guarantee security of the management application and the issuer application.

In addition, in the step S14, the state information included in the reference table is updated so as to coincide with the current state information. However, when updating of the state information failed, subsequent processing may forcibly be finished. Accordingly, it is possible to prevent whether or not the respective issuer applications are erroneously available from being displayed in a lump on the display part 16.

What is claimed is:

1. A mobile terminal comprising:
an issuer application storage unit configured to store a plurality of issuer applications, each issuer application managing settlement information of an issuer providing a credit settlement service;
an IC chip receptacle having an IC chip stored therein;
the IC chip having a plurality of storage areas and a table including current state information for each issuer application, each storage area being assigned to each issuer application stored in the issuer application storage, each storage area storing settlement information managed by the issuer application, the current state information indicating whether or not the storage area of the issuer application is validated;
a switching instruction information reception unit configured to receive switching instruction information to instruct switching of validation and invalidation of the storage area assigned to one issuer application from an issuer terminal managed by one issuer corresponding to one of the storage areas in the IC chip to indicate whether credit settlement service to the user of the mobile terminal is available from the issuer;
a storage area control unit configured to individually switch validation and invalidation of each storage area by updating the current state information corresponding to the one issuer based on the switching instruction information received by the switching instruction information reception unit from each issuer; and
a management application storage unit configured to store a management application to cause a display unit to display in a lump whether or not each issuer application is available based on the current state information for each issuer application when the issuer application is started.

2. The mobile terminal according to claim 1, further comprising:
a reference table storage unit configured to store a reference table including the state information after the storage area control unit has switched validation and invalidation of the storage area;
a current state information reception unit configured to receive from the IC chip current state information when the issuer application is started; and
a reference table update unit configured to update the state information included in the reference table based on the current state information, if the current state information does not coincide with the state information when collating the current state information received by the current state information reception unit and the state information within the reference table, wherein
the management application displays in a lump whether or not each issuer application is available based on the state information stored in the reference table, without accessing to the IC chip.

* * * * *